Aug. 16, 1949.  W. W. DAVIDSON  2,479,060
COLLATOR
Filed July 1, 1944  7 Sheets-Sheet 1

INVENTOR:
WILLIAM WARD DAVIDSON,
ATTORNEYS

Aug. 16, 1949. W. W. DAVIDSON 2,479,060
COLLATOR
Filed July 1, 1944 7 Sheets-Sheet 5

INVENTOR:
WILLIAM WARD DAVIDSON,
BY
ATTORNEYS

Aug. 16, 1949.    W. W. DAVIDSON    2,479,060
COLLATOR
Filed July 1, 1944    7 Sheets-Sheet 6

INVENTOR:
WILLIAM WARD DAVIDSON,
BY ATTORNEYS

Aug. 16, 1949. W. W. DAVIDSON 2,479,060
COLLATOR
Filed July 1, 1944 7 Sheets-Sheet 7

INVENTOR:
WILLIAM WARD DAVIDSON,
BY ATTORNEYS

Patented Aug. 16, 1949

2,479,060

UNITED STATES PATENT OFFICE 2,479,060

COLLATOR

William Ward Davidson, Evanston, Ill., assignor to Davidson Manufacturing Corporation, a corporation of Illinois Application July 1, 1944, Serial No. 543,142

9 Claims. (Cl. 270—58)

My invention relates to the type of collator that comprises a series of feeders for feeding sheets from corresponding supply stacks in combination with a conveyor fed by the feeders, the advance of the conveyor being synchronized with the operation of the feeders to cause the desired groups of sheets to be formed progressively on the conveyor with the sheets in each finished group arranged in the same sequence as the feeders.

If any one feeder fails to function correctly in such a collator either by failing to pick up a sheet from a supply stack or by picking up two or more sheets at once, some remedial action becomes necessary to avoid the formation of a defective group on the conveyor. Usually the remedial action is simply to stop the machine long enough for the manual addition of a sheet to a group on the conveyor or for the removal of an excess sheet as may be required. If the faulty feeding operation is caused by some structural failure, or by some significant maladjustment, mechanical attention is required before satisfactory operation can be resumed. More often than not, however, a faulty feeding operation is merely an incidental operational failure that is to be expected occasionally in such complicated machines and normal operation may be resumed without special attention or delay.

Stopping a collator merely to manipulate one or two sheets manually is costly in production and the penalty increases rapidly with increase of the number of feeders employed. In the preferred practice of my invention, a group of objects is directed to the reduction of the usual penalty in production that arises merely from an incidental failure of one or more feeders in a feeding cycle of operation. This group of objects includes the following: to avoid stopping the apparatus when feed failures occur that are only incidental; to provide for the automatic repetition of a feeding cycle whenever faulty feeding occurs; to prevent such automatic repetition from resulting in the formation of defective groups of sheets on the conveyor; to achieve such prevention by in effect skipping faulty feed cycles, that is to say by discarding all the sheets fed on a faulty cycle and delaying the conveyor for that cycle; to provide an efficient arrangement for skipping a feed cycle in response to the failure of any of the series of feeders to feed one sheet and one sheet only; to discriminate between incidental feeding failures and feeding failures arising from significant mechanical factors demanding immediate personal attention; and to attract the attention of the operator and/or to stop the machine automatically whenever the machine skips an excessive number of feeding cycles in a short period of time.

When the usual collator of the present general type is initially placed in operation with the conveyor clear of sheets, an initial series of incomplete groups is delivered by the conveyor. For example, if the conveyor receives sheets from ten feeders nine incomplete groups will be delivered by the conveyor before the first complete group is delivered. This undesirable initial effect can be avoided only by taking time to properly distribute sheets on the conveyor prior to initiating operation. In conventional practice the operator cannot avoid either taking time to make an initial distribution on the conveyor by hand or subsequently dealing with a succession of incomplete groups on the conveyor.

One of the objects of the preferred form of my invention is to avoid the necessity of making such a choice. This object is attained by providing what may be termed an automatic initial control that places the series of feeders in operation progressively, one additional feeder being initiated in operation on each feeding cycle. No manual handling of sheets is required and this preliminary operation of the machine is performed at normal running speed so that the time involved is inconsequential.

One object of my invention is to provide an apparatus that is flexible in the sense of being adaptable to different modes of operation and control. It is contemplated, for example, that the apparatus may be operated with automatic skipping of faulty feed cycles, as mentioned above, or may be adjusted to operate in a well known manner in which the machine automatically stops completely in response to faulty feed. If desired, the apparatus may be adjusted merely to signalize a faulty feeding operation to give the operator an opportunity to take an appropriate action.

With reference to those modes of operation in which the operator is required to take corrective action whenever a faulty feeding operation occurs, a further object of my invention is to provide an efficient control means at the disposal of the operator whereby the operator may operate the feeders selectively by remote control in compensation for a faulty feeding operation and may also cause the conveyor to pause long enough for the corrective action. This object is accomplished essentially by providing means for temporarily stopping the conveyor and by further providing a remote control means for all of the feeders, which remote control means is manually movable to three positions, namely, a position that permits all of the feeders to operate in a normal manner, a second position rendering all but a selected one of the feeders inoperative and a third position making all of the feeders inoperative.

In the preferred practice of my invention, further objects relate to the control of supply stacks of sheets from which the feeders separate sheets for delivery to the conveyor. One of these objects is to provide an improved mechanism for automatically maintaining the tops of the stacks at substantially the constant level required for the sheet feeding operations. Another of these objects is to provide a certain safety expedient to avoid accidents in the periodic manual lowering of the stack supporting means. This latter object is accomplished by providing a safety latch to prevent manual lowering of the stack supporting means unless the means for manipulation by the operator is actually grasped by the operator to be fully under his control.

A further object in the preferred practice of my invention arises when the successive groups of sheets are moved past the feeders by pushers and the pushers may interfere with the proper deposition of a sheet on the conveyor. This problem is met by providing for each of the group pushers to be automatically retracted slightly at the point in the operating cycle at which sheets are added to the groups.

The above and other objects and advantages of my invention will be apparent in the following description taken with the accompanying drawings.

In the drawings which are to be regarded as illustrative only,

Fig. 3 is a side elevation of the group conveyor with some parts omitted for simplicity.

General arrangement

Figure 1:
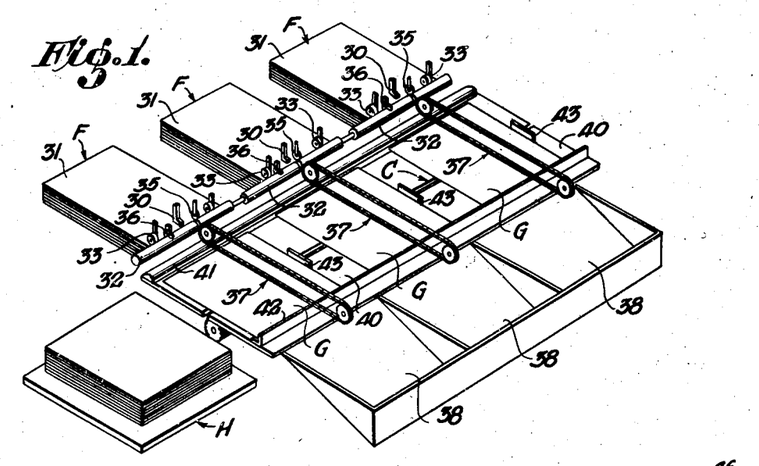
Fig. 1 is a diagrammatic view in perspective of certain essential parts of the general combination.
Figure 2:
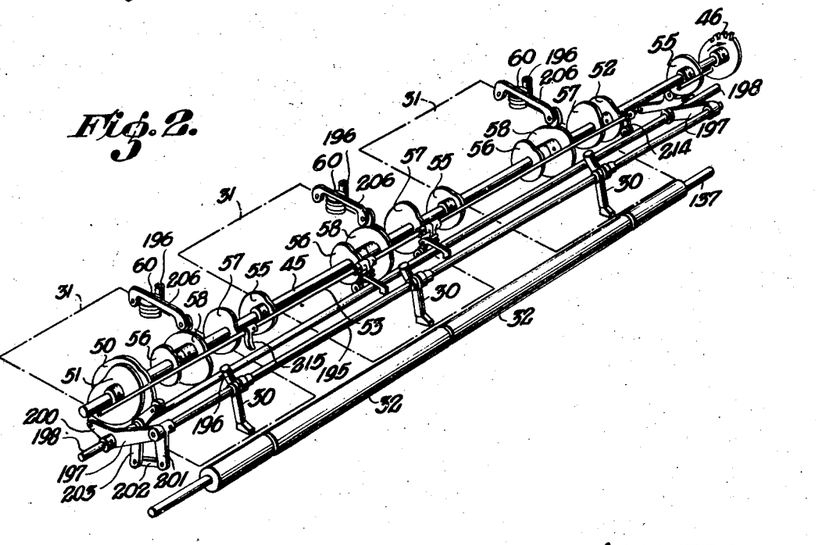
Fig. 2 is a diagrammatic perspective view of a series of cams employed in the automatic operation of the apparatus.

The general arrangement of the preferred form of my invention may be understood by referring to Fig. 1 for a perspective diagrammatic view of the apparatus as a whole and by referring to Fig. 2 for a perspective diagrammatic view of a cam shaft that correlates various moving parts of the apparatus.

Fig. 1 shows three feeders generally designated F arranged along a group conveyor generally designated C. For simplicity only three feeders F are shown and the group conveyor C is correspondingly short, but it will be understood that a larger number of feeders may be arranged along a group conveyor of corresponding greater length. It is contemplated that in commercial practice the apparatus will be manufactured in self-sufficient units comprising, say three to six feeders together with an associated group conveyor and that such units will be adapted for arrangement in tandem to form a series of units coordinated to function in the manner of one extensive collator with numerous correlated feeders. In this contemplated practice, units may be added or subtracted as desired.

The principal parts of each of the feeders F shown in Fig. 1 are: a vacuum or suction head 30 adapted to lift one sheet at a time from a supply stack 31; a long feed roll 32; a pair of spring-pressed rolls 33 cooperating with the long feed roll 32; a detector 35 that functions whenever the vacuum head fails to feed a sheet to the rolls 32 and 33; a second detector 36 that functions whenever the vacuum head feeds two or more sheets in one operation; and a transverse conveyor generally designated 37 for carrying sheets from the feed roll 32 to what may be termed feeding stations or receiving stations on the group conveyor C. In the preferred practice of my invention, whenever one of the detectors 35 and 36 of any of the feeders F functions in response to a faulty feeding operation, the transverse conveyors 37 carry the sheets that are fed at this time to corresponding discard trays or bins 38, there being one discard bin for each of the feeders F.

The conveyor C travels in timed relation to operation of the feeders F to the end that groups G of sheets in proper sequence will be formed progressively on the conveyor C. The groups G rest on a fixed conveyor top 40 between two guide rails 41 and 42 and are pushed along the conveyor top by pushers 43, preferably in an intermittent manner, the groups pausing to receive a sheet from each of the feeders. When the groups G are completed in the described manner, they may be delivered by the conveyor C to any other machine or to a conveyor leading to a machine or to storage or to a stack holder, generally designated H, shown here by way of example.

Correlation of the feeders F with each other and with the conveyor C is based on a feeding cycle, in each of which cycles all of the feeders operate substantially in unison and the conveyor C advances all groups from one feeding station to another. In the present practice of my invention, the required correlation of the numerous working parts for each feeding cycle is achieved through the medium of a cam shaft 45, best shown in Fig. 2, the cam shaft being driven by a suitable pinion 46 on one end.

Mounted on the cam shaft 45 are three cams that serve all of the feeders as a group, namely, a cam 50 to give one component of movement to the suction head 30, a cam 51 to give a second component of movement to the suction head, and a cam 52 the function of which is to restore a detector shaft 53 to normal position whenever one of the detectors 35 or 36 functions at any one of the feeders.

Also mounted on the cam shaft 45 are four cams for each of the feeders F, namely, a cam 55 to control the supply stack at the feeder, a cam 56 to actuate the detector 35, a cam 57 to actuate the detector 36, and a cam 58 to actuate a valve 60 that controls the vacuum in the suction head 30.

The apparatus will be described in detail as constructed and adapted for a preferred mode of operation. Briefly described, this preferred mode of operation is as follows. The series of feeders F are initiated progressively at the beginning of a run to avoid the delivery of incomplete groups of sheets to the stack holder H. During normal operation the sheets from the feeders F are dropped by the transverse conveyors 37 on to the group conveyor C; but, whenever any of the feeders F fails to function properly, the corresponding detector 35 or 36 will cause all of the transverse conveyors 37 to deliver the fed sheets to the discard bins 38 and the group conveyor C will pause to skip that particular feeding cycle. Ordinarily the apparatus will continue to operate whenever a feeding cycle is skipped. Whenever, however, an excessive number of feeding cycles are skipped in a relatively short period of time, personal attention will be required and the machine will stop automatically in response to such excessive skipping.

*The group conveyor*

Figure 4:
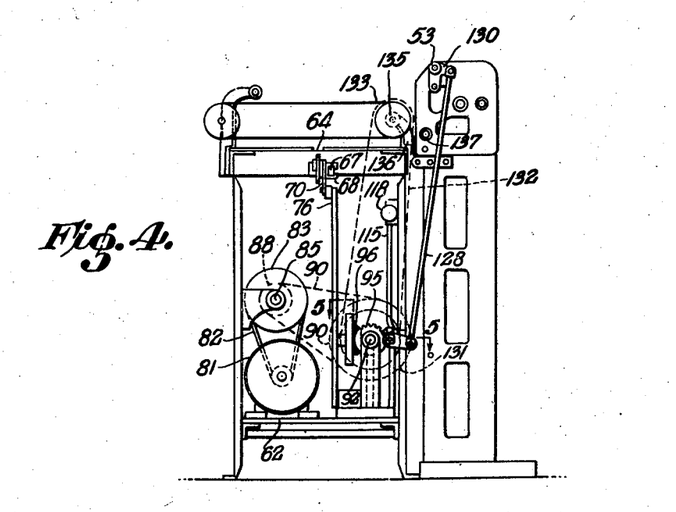
Fig. 4 is an end elevation of the conveyor.
Figure 15:
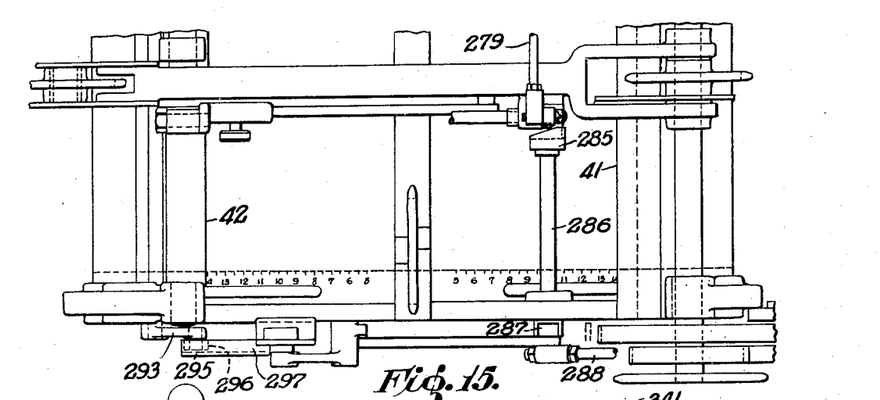
Fig. 15 is a fragmentary view showing in plan the mechanism of Fig. 13 in plan.

It is contemplated that the framework of the apparatus will be of light sheet metal construction. In Figs. 3 and 4 the frame of the group conveyor C comprises four sheet metal legs 61 and suitable angle irons attached thereto to support the conveyor top 40 and a lower shelf 62. The two guide rails 41 and 42 are movably mounted on the conveyor top for adjustable spacing to fit sheets of various dimensions, and spacing scales, such as shown in Fig. 15, may be provided for convenience of the operator. The pushers 43 are mounted at suitably spaced points on a continuous sprocket chain 63 that passes over sprockets 65 at the two ends of the conveyor C. When in effective position, the pushers 43 extend upward through a longitudinal slot 64 in the conveyor top 40. For intermittent actuation of the pushers 43, the sprocket chain 63 also carries inwardly directed actuation lugs 66 spaced apart the distance the pushers 43 are to be moved for each feeding cycle.

Just below the conveyor top 40 is a longitudinal bar or track 67 on which is mounted a slide 68 carrying a pivot bell crank 70, the bell crank having a short arcuate slot 71 engaging a fixed pin 72 on the slide to limit rotation of the bell crank. One arm of the bell crank forms a relatively wide open jaw 73 for engagement with the actuating lugs 66 successively and the other arm of the bell crank is connected by a link 75 with a drive arm 76, the drive arm being connected by a link 77 with an actuating crank 78.

When the drive arm 76 swings to the right, as viewed in Fig. 3, it initially rotates the bell crank 70 to one limit position with the jaw 73 dropped below the plane of the actuating lugs 66. When the drive arm 76 reaches its right limit position and reverses, the initial movement in the opposite direction rotates the bell crank 70 to move the jaw 73 upward into engagement with an actuating lug 66, as shown in Fig. 3. Continued leftward movement of the drive arm 76 causes the jaw 73 to move the actuating lug 66 the distance required to advance all of the groups of sheets G on the conveyor from one feeder F to the next, whereupon the change to rightward movement on the part of the drive arm 76 disengages the jaw 73 for repetition of the conveyor driving operation.

In my preferred mode of operation the pushers 43 are slightly retracted immediately after each advance to avoid the possibility of a newly fed sheet coming to rest with its margin extending over the pusher. A simple expedient for causing the desired slight retraction is to provide some form of stop to delay the rotation of the bell crank 70 out of engagement with the actuation lug when the drive arm 76 begins its rightward movement. Thus I may provide a block or shoulder 80 on the side of the track 67 in the position shown in Fig. 3. At the beginning of the rightward movement of the drive arm 76, the jaw 73 rides on to the shoulder 80 for a short distance before passing over the end of the shoulder to drop out of engagement with the actuation lug 66, the short distance being sufficient to cause the jaw to retract the lug slightly and thereby retract all of the pushers 43 on the sprocket chain 63.

On the lower shelf 62 of the group conveyor C is a motor 81 for energizing all the moving parts of the collator, the motor being for this purpose connected by a belt 82 with a sheave 83 on a drive shaft 85. A number of vacuum pumps 86 are driven from the drive shaft 85 through the medium of belts 87, these pumps being employed for creating a vacuum in the various suction heads 30. At the end of the drive shaft 65 is a sheave 88 connected by a belt 90 to a larger sheave 91 on a countershaft 92. The countershaft 92 is connected with the previously mentioned actuating crank 78 through the medium of a clutch generally designated 93 and two bevel gears 95 and 96.

Figure 5:
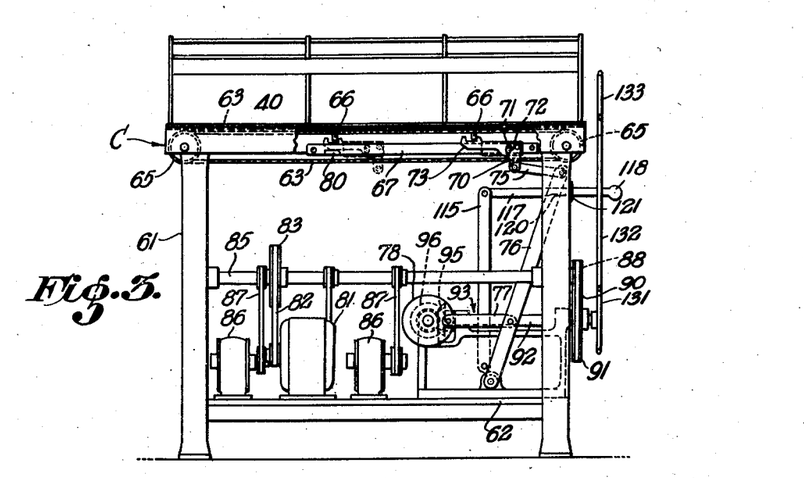
Fig. 5 is a section through a clutch mechanism taken as indicated by the line 5—5 of Fig. 4.

The construction of the clutch 93 may be understood by referring to Fig. 5. A clutch collar 97 fixedly mounted on the countershaft 92 by a cross pin 98 has at least one longitudinal recess 99 to receive a complementary longitudinal tongue 100 of a second clutch collar 101 that is slidingly mounted on the countershaft. The slidable clutch collar 101 has a circumferential groove 102 for engagement by a control fork 103 and has a single dog portion 105 for releasable engagement with a single complementary recess 106 in the end of a clutch sleeve 107, the previously mentioned bevel gear 95 being integral with the clutch sleeve for actuation thereby. The mechanism connected through the clutch 93 can operate only in synchronism since the dog portion 105 can enter the recess 106 at only one relative rotary position. The clutch sleeve 107 serves as a bearing for journaling the countershaft 92 and is in turn journaled in and supported by a fixed bearing 108. A second fixed bearing 110 embraces the countershaft on the other side of the fixed clutch collar 101.

Integral with the fixed bearings 108 and 110, respectively, are two small brackets 111 for a slide rod 112 positioned parallel with the countershaft 92. The slide rod 112 carries the control fork 103 and is provided with a coil spring 113 that continuously urges the slide rod in the longitudinal direction to force the slidable clutch collar 101 into actuating engagement with the clutch sleeve 107.

It is contemplated that longitudinal movement of the slide rod 112 in opposition to the spring 113 will be subject to two independent controls, one being a manual control and the other being an automatic control. The manual control in the present construction includes a lever 115 (Fig. 3) that is connected with the slide rod 112 at the fork 103 by means of a link 116. A substantially horizontal pull bar 117 having a convenient handle 118 is connected to the upper end of the lever 115 and is provided with a notch 120 for releasable engagement with a transverse latch plate 121. The pull bar 117 extends through a slot (not shown) in the latch plate 121, and if the handle 118 is pulled out to place the pull bar notch 120 in engagement with the latch plate 121, the clutch 93 will be held in disengagement.

The automatic control for the clutch 93 includes a cam member 122 rotatably mounted on the slide rod 112 between one of the brackets 111 and a small body 123 on the end of the slide rod. The cam member 122 has a radial operating arm 125 and an inclined cam face 126 for engagement with a roller 127 on the body 123. Since the spring 113 urges the roller 127 towards the cam face 126, the angular position of the cam member 122 determines the longitudinal position of the slide rod 112. The clutch 93 is engaged during normal operation of the collator but is subject to disengagement by rotation of the cam member 122 to the position shown in Fig. 5.

As best shown in Fig. 4, the operating arm 125 of the cam member 122 is connected by an operating rod 128 with an arm 130 on the previously mentioned detector shaft 53. As will be later explained, the detector shaft 53 rocks in response to actuation of any of the detectors 35 and 36 of the various feeders F, thereby causing disengagement of the clutch 93 to interrupt operation of the conveyor C and at the same time causing the various transverse conveyors 37 to carry the fed sheets to the discard bins 38.

The countershaft 92 is also used for actuating various moving parts of the feeders F. For this purpose a sprocket 131 on the end of the countershaft is connected by a sprocket chain 132 with a sprocket 133 on the end of a longitudinal shaft 135, the shaft 135 being journaled in suitable brackets 136 above the conveyor top 40. By means of a suitable train of gears shown in dotted lines in Fig. 14, the longitudinal shaft 135 is operatively connected to a shaft 137 on which the feed roll 32 is mounted and is also operatively connected with the previously mentioned cam shaft 45 that is common to all of the feeders. The described driving arrangement is such that the cam shaft 45 makes one rotation for each rotation of the countershaft 92.

Automatic feed stack control

Figure 6:
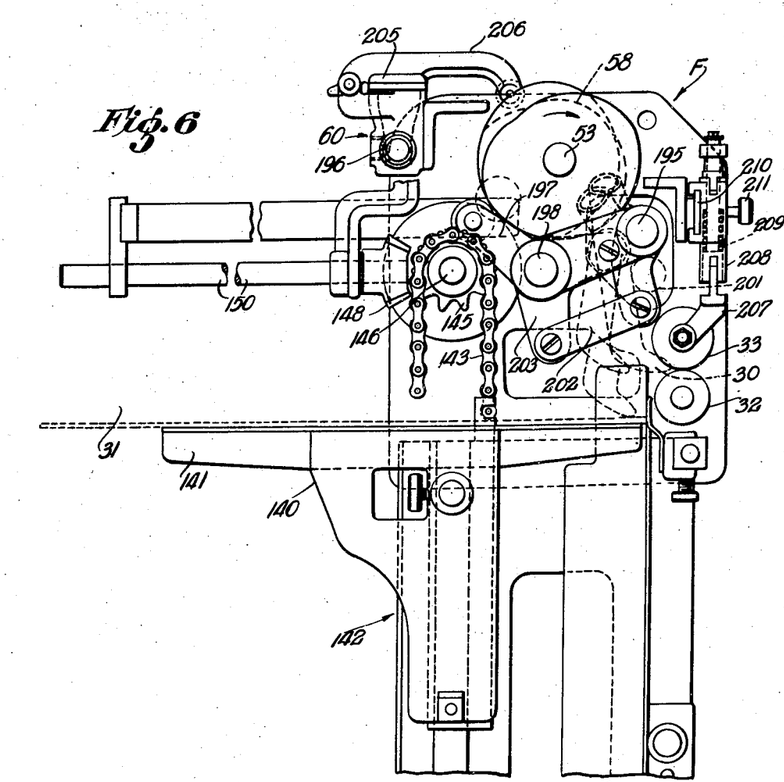
Fig. 6 is a transverse section showing certain mechanism of the sheet feeders.
Figures 7, 8:
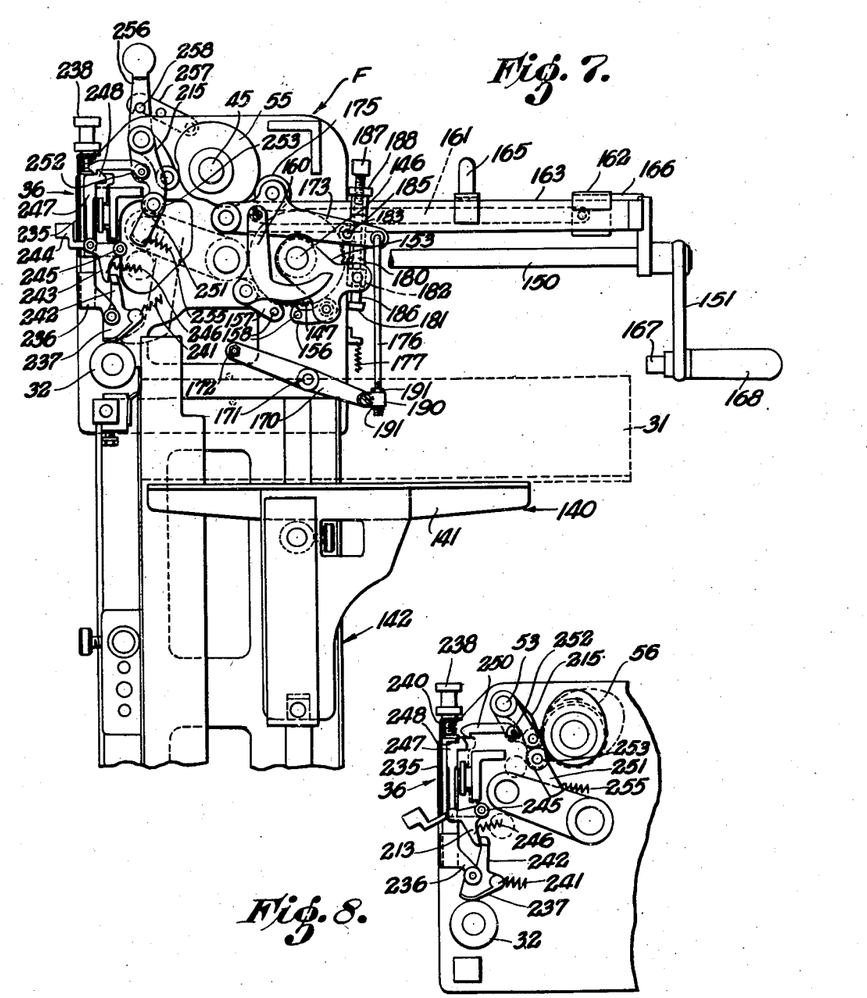
Fig. 7 is a similar section taken at another point and viewed from the opposite direction to reveal other elements involved in sheet feeding.
Fig. 8 is a fragmentary transverse section at a feeder showing a mechanism for detecting the feeding of more than one sheet at a time.
Figure 11:
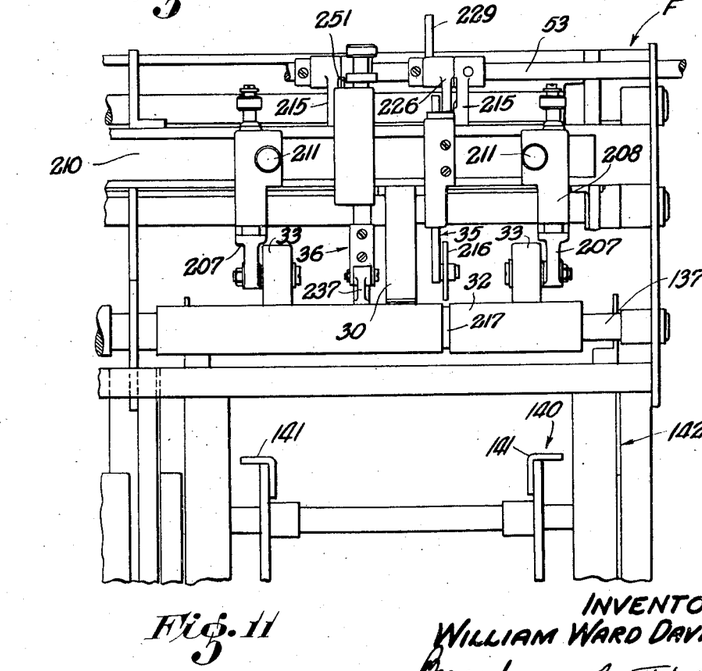
Fig. 11 is a fragmentary view showing in front elevation certain parts of a feeder, other parts being omitted for simplicity.

As indicated in Figs. 6, 7 and 11, each of the feeders F is provided with a vertically movable carriage generally designated 140 for a supply stack 31, which carriage may include two parallel angle bars 141 on which a piece of heavy cardboard (not shown) may be mounted to support a stack of sheets. The carriage 140 is vertically movable on the sheet metal framework of the feeder, which framework is generally designated by numeral 142. For vertical control the carriage 140 is connected to a sprocket chain 143 that leads over a control sprocket 145 and is terminally connected to a suitable counterweight (not shown). A short shaft 146 to which the sprocket 145 is keyed also carries a ratchet wheel 147 for automatic control of the carriage 140 and is additionally connected through bevel gears 148 with a shaft 150 leading to a crank 151 for manual actuation of the carriage.

A pawl frame 153 comprising two plates on opposite sides of the ratchet wheel 147 is pivotally mounted on the same shaft 146. Pivotally mounted on the pawl frame 153 is an actuating pawl 156 that is urged by a suitable spring, not shown, into engagement with the ratchet wheel 147. A second retaining pawl 157 is mounted on a fixed pivot adjacent the ratchet wheel and is also urged into engagement with the ratchet wheel. Oscillation of sufficient magnitude of the pawl frame 153 will cause the pawl 156 to engage a tooth of the ratchet wheel 147 for advancement of the ratchet wheel and the retaining pawl 157 will prevent the ratchet wheel from rotating in the opposite direction when the pawl 156 retreats.

The two pawls 156 and 157 have laterally extending pins 158 for engagement by a release bell crank 160, which bell crank is connected by an operating bar 161 with a slide 162 on a fixed slide bar 163. When the operating bar 161 is moved outwardly by a handle 165 thereon, the bell crank 160 forces the two pawls 156 and 157 out of engagement with the ratchet wheel thereby releasing the carriage for manual movement by the crank 151. When the operating bar is thus manipulated, however, a safety finger 166 unitary with the slide 162 moves into the path of a safety lug 167 on the crank 151. This safety lug 167 is normally in a position to strike the extended safety finger 166 thereby to prevent any extensive downward movement of the carriage 140 but the safety lug is unitary with the handle 168 of the crank and the handle may be shifted along its own axis against the pressure of a suitable spring in the handle (not shown) to clear the safety finger. Accidents are prevented by this arrangement, since the operator must firmly grasp and shift the handle 168 of the crank to release the carriage 140 for downward movement.

It is contemplated that the pivoted pawl frame 153 will be associated with a follower for contact with the top of the supply stack 31 and with an oscillating driving means for advancing the ratchet wheel 147 whenever the need for such advance is ascertained by the follower. In the present preferred arrangement, the follower comprises a follower lever 170 on a fulcrum 171 and a small feeler rod 172 extending laterally from the lever for movement in an arc towards and away from the supply stack 31. In each feeder F the required oscillating driving means comprises the previously mentioned cam 55 and a cooperating driving arm 173 having a roller 175 in cooperative contact with the cam 55. A connecting rod 176 linking the outer end of the driving arm 173 with the follower lever 170 causes the feeler rod 172 of the follower to be elevated whenever the cam 55 forces the arm 173 downward. Suitable yielding means such as a spring 177 acting on the follower lever 170 causes the return downward movement of the feeler rod 172 and the return upward movement of the driving arm 173. It is to be noted that the cam acts in a positive manner to lift the feeler rod 172 to a predetermined and constant upper limit position but that the opposite lower limit position of the feeler rod is determined by its contact with the top of the supply stack 31 and will vary with the level of the top sheet of the stack.

To complete the automatic mechanism for regulating the level of the supply stack 31, a lost-motion driving connection is provided for actuation of the pivoted pawl frame 153. As best shown in Fig. 7, the present construction includes two spaced tappets 180 and 181 carried by the oscillating driving means to move the pivoted pawl frame 153 by impact alternately in opposite directions, the impact being made against a small cross head 182 that is rotatably mounted on the pivoted pawl frame. The upper tappet 180 is on the lower end of an internally threaded sleeve 183 that is mounted on the driving arm 173 by a suitable pivot 185 and the second tappet 181 is a head formed on a short rod 186 that is adjustably threaded into the sleeve 183. The distance between the two tappets 181 may be adjusted by manipulating a knurled head 187 on the upper end of the rod 186 and may be releasably fixed by a suitable lock nut 188.

The cam shaft 45 makes one rotation in each feeding cycle of the feeder and therefore causes the follower lever 170 to rise and fall once during each feeding cycle. At the point of maximum elevation of the feeler rod 172, the pawl 156 is at the inner end of the inclined face of a tooth on the ratchet wheel 147, this being a limit position of the pawl. As the feeler rod 172 moves downward towards the top of the supply stack 31, the pawl 156 retracts along the face of the tooth but the other pawl 157 prevents corresponding reverse rotation of the ratchet wheel 147. If the top of the supply stack 31 is at or above a predetermined level, the feeler rod 172 in making the contact with the supply stack will stop retraction of the pawl 156 before the pawl reaches a position to engage a new tooth of the ratchet wheel. If the stack level is below the predetermined level, the pawl 156 will engage a new tooth of the ratchet wheel and subsequent depression of the driving arm 173 by the cam 55 will cause the pawl 156 to rotate the ratchet wheel 147 one tooth and thereby actuate the shaft 146 to cause corresponding elevation of the supply stack carriage 140.

It is to be noted that the cam 55 acts in a positive manner to elevate the carriage, the cam forcing the tappet 180 downward against the cross head 182 of the pawl frame. Preferably the connecting rod 176 is adjustable in its effective length for variation in the average level at which the top of the supply stack is maintained by the described mechanism. Thus, as shown in Fig. 7, the connecting rod 176 may be adjustably threaded into a connecting member in the form of a clevis 190 and releasably retained at a desired adjustment by means of two lock nuts 191.

Mechanism for separating sheets from supply stacks

Each of the suction heads 30 is fixedly mounted on a suction head shaft 195 that is common to all of the feeders F and each of the suction heads is connected by a flexible air hose 196 with a corresponding valve 60, the function of the valve being to make and break vacuum in the suction head with proper timing relative to the feeding movements of the suction head. The suction head shaft 195 is carried by and journalled in two or more rocker arms 197 of a rocker shaft 198, the angular position of the shaft being controlled by an arm 200 having a suitable roller in contact with the previously mentioned cam 51 on the cam shaft 45. It is readily apparent from Fig. 2 that by virtue of the described arrangement the cam 51 controls a vertical component of motion for all the suction heads 30.

The second component of motion of the suction heads 30 is achieved by rocking the suction head shaft 195 to swing the suction heads towards and away from the feed rolls 32 of the various feeders F. To this end an arm 201 extending downwardly from the suction head shaft 195 is connected by a link 202 to one arm of a lever 203 fulcrumed on the previously mentioned rocker shaft 198, the lever being freely rotatable on the shaft. The other arm of the lever 203 carries a roller in contact with the previously mentioned cam 50.

The two cams 50 and 51 together with the described mechanism associated therewith causes the various suction heads 30 of the feeders to move in closed paths, the suction heads moving downward to the tops of the supply stacks 31 and then moving upward and forward to feed the sheets to the rolls 32.

The construction of the valves 60 for controlling air pressure in the suction heads 30 may be readily understood by reference to Figs. 2 and 6. The air hose 196 from each suction head 30 connects with the side of the corresponding valve 60 and an air pipe or manifold (not shown) from one of the vacuum pumps 86 connects with the bottom of each of the valves. Each of the valves 60 is merely a hollow means and in effect constitutes a portion of the air line that is adapted to be temporarily opened to the atmosphere for breaking the vacuum in the corresponding vacuum head 30.

In the present construction each of the valves 60 has a hinged cover 205 with an arm 206 extending from the cover and carrying a suitable roller for operative contact with the corresponding cam 58. When a suction head 30 approaches the top of a supply stack to pick up a sheet, the corresponding cam 58 permits the corresponding valve 60 to close thereby to create a vacuum in the suction head effective to pick up the top sheet of the supply stack. When the suction head through operation of cams 50 and 51 carries the sheet into engagement with the feed roll 32, the cam 58 opens the valve 60 to destroy the vacuum in the suction head thereby to fully release the sheet to the feed roll.

The cooperation of the spring pressed rolls 33 with the feed roll 32 is made apparent in Figs. 6 and 11. Each of the rolls 33 is mounted on a bracket member 207 that is adjustably mounted in a bracket housing 208, a concealed spring 209 in the housing continuously urging the bracket member downwardly. The bracket housings 208 are slidingly mounted on a support bar 210 and releasably retained thereon by thumbscrews 211 so that the spacing of the two rolls 33 may be varied to suit sheets of various width. Preferably the two spring pressed rolls 33 are turned to slightly diverging directions so that they tend to pull a sheet taut lengthwise of the feed roll 32.

*Mechanism for detecting faulty sheet feeding operations*

It is contemplated that the detector shaft 53 will have a normal position of rotation so long as the various feeders of the apparatus are functioning in the normal manner, and that the detector shaft will be rotated out of its normal position when any of the numerous detectors 35 and 36 function. To make the detector shaft 53 responsive to each of the detectors, small operating arms 215 are keyed to the shaft, there being one such operating arm for each of the various detectors 35 and one such arm for each of the various detectors 36. Some of the operating arms 215 are omitted in Fig. 2 for clarity. At a suitably early point in the feeding cycle, any of the detectors may trip a corresponding arm 215 to rotate the detector shaft 53 out of its normal position. At a later point in the cycle, the cam 52 becomes effective to act on an arm 214 (Fig. 2) to restore the detector shaft 53. In some practices of the invention, the detector shaft 53 is primarily a control means. In other practices, the detector shaft operates signals and may be regarded as an indicative means.

Figure 9:
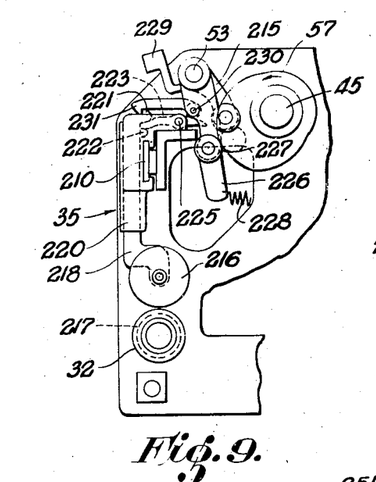
Fig. 9 is a view similar to Fig. 7 showing means for detecting the failure of a feeder to pick up a sheet for delivery to a conveyor.
Figure 10:
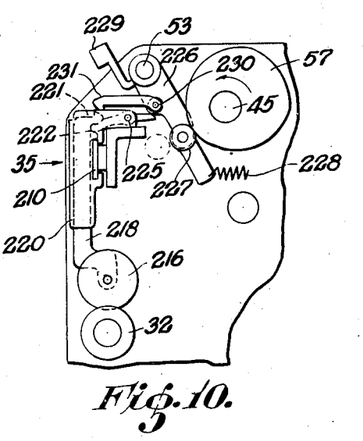
Fig. 10 is a view similar to Fig. 8 showing the mechanism in an alternative position.

The construction of a detector 35 to function whenever a feeder fails to pick up a sheet from the supply stack and the manner in which the detector is mechanically related to the detector shaft 53 may be understood by referring to Figs. 9, 10 and 11.

A detector 35 includes a thin detector wheel 216 adapted to move in a vertical path into and out of a complementary circumferential groove 217 in the feed roll 32. It is contemplated that the downward movement of the detector wheel 216 into the circumferential groove 217 may be arrested by the intervention of a sheet passing over the feed roll, in which event the detector 35 will not affect the detector shaft 53; but, that whenever, in the absence of a sheet on the feed roll 32, the detector wheel 216 enters the circumferential groove 217, the immediate result will be mechanical operation of the corresponding operating arm 215 on the detector shaft 53.

In the construction shown in the drawings, a bracket member 218 carrying the thin detector wheel 216 is slidingly mounted in a bracket housing 220, which bracket housing is fixedly mounted on the previously mentioned support bar 210. As shown in Figs. 9 and 10, the slidable bracket member 218 is formed with a stop shoulder 221 on its upper end and is also formed with a lateral recess 222 into which fits one arm of a smaller lever 223 fulcrumed on a pin 225. Rotatably mounted on the detector shaft 53 in a position to straddle the small lever 223 is a forked arm 226 carrying a roller 227 for cooperating with the previously mentioned cam 57 on the cam shaft 45. Preferably the arm 226 also carries a metal signal flag 229. A suitable spring 228 continuously urges the forked arm counterclockwise, as viewed in Fig. 9. A stud 230 mounted on the forked arm 226 has a dual function: first, to serve as pivot means for a hook member 231 carried by the forked arm, and second, to serve as means for abutting the corresponding one of the previously mentioned operating arms 215 to actuate the detector shaft 53 in response to excessive counterclockwise rotation of the forked arm 226.

In the course of each feeding cycle the operation of the detector 35 is as follows: early in the cycle the cam 57 acting against the roller 227 swings the forked arm 226 clockwise against the resistance of the spring 228. This counterclockwise movement of the forked arm 226 initially moves the hook member 231 leftward out of pressure contact with the stop shoulder 221 to avoid interfering with later gravitational movement of the bracket member 218. As a later result of this clockwise movement of the forked arm 226, the hub portion of the hook member 231 presses against the small lever 223 thereby causing the small lever 223, as shown in Fig. 9, to lift the bracket member 218, the purpose of such action being to lift the thin detector wheel 216 well above the feed roll 32 thereby to avoid interference with the feeding of a new sheet to the feed roll. As continued rotation of the cam 57 permits the spring 228 to reverse the movement of the forked arm 226 thereby to release the small lever 223 and permit downward gravitational movement of the bracket member and thin detector wheel, the hook member 231 continues to remain out of contact with the stop shoulder 221 to avoid interference with such gravitational movement. In other words, the retraction of the hook member 231 towards the stop shoulder 221 is delayed to give the thin detector wheel 216 freedom to drop into the circumferential groove 217 in the absence of a sheet of paper on the feed roll 32.

If a sheet of paper prevents the gravitational movement of the thin detector wheel, the stop shoulder 221 remains elevated to be engaged by the hook member 231 to limit the counterclockwise rotation of the forked arm 226 by the spring 228 thereby preventing the stud 230 on the forked arm from moving against the corresponding operating arm 215 of the detector shaft. On the other hand, if failure of the feeder to carry a sheet to the feed roll 32 results in gravitational movement of the thin detector wheel 216 into the circumferential groove 217, the stop shoulder 221 will drop clear of the path of movement of the hook member 231 and further rotation of the cam 57 will permit the spring 228 to rotate the forked arm 226 excessively, as shown in Fig. 10, whereupon the stud 230 will move against the corresponding operating arm 215 to trip the detector shaft 53. In such event, after a short period of time in the feeding cycle, the previously mentioned cam 52 cooperating with the arm 214 will restore the detector shaft 53 to its normal position.

Each of the detectors 36 for responding to the feeding of plural sheets is related to the detector shaft 53 in somewhat the same manner as above described. As best shown in Figs. 7 and 8, each of the detectors 36 includes a housing 235 mounted on the previously mentioned support bar 210. Slidingly extending through the housing 235 is a bracket member 236 carrying a pivoted caliper member 237. A suitable thumbscrew 238 at the top of the housing 235 permits precise adjustment of the caliper member 237 relative to the feed roll 32, precision being insured by the use of a suitable spring 240 to take up backlash. The caliper member 237 is spaced from the periphery of the roll 32 by a distance greater than one of the sheets being handled by the feeder but less than the thickness of two such sheets. As a result a single sheet will pass over the roll 32 without affecting the caliper member 237 but whenever two sheets intervene between the caliper member and the roll, the caliper member will be thereby swung in a clockwise direction from the normal position shown in Fig. 7 to the trip position shown in Fig. 8.

The caliper member 237 is normally held in a normal limit position by means, such as a spring 241. At such time an upwardly extending finger 242 of the caliper means presses against a downwardly extending arm of a bell crank 243 that is pivoted on a pin 245. Preferably the bell crank 243 carries a signal flag 244. A suitable spring 246 tends to swing the bell crank 243 counterclockwise but is of insufficient strength to overcome the opposition of the spring 241.

Pivotally connected to the bell crank 243 is an upwardly extending stop member 247 presenting a stop shoulder 248 in the path of movement of a hook member 250. The hook member 250 is mounted in a forked arm 251 by a stud 252, which stud extends laterally from the forked arm for movement against a corresponding one of the previously mentioned operating arms 215 on the detector shaft 53. The forked arm 251 has a roller 253 for contact with the previously mentioned cam 56 on the cam shaft 45 and is continuously urged in the direction of such contact by a suitable spring 255.

In the course of each feeding cycle the cam 56 rotates to a position to permit the spring 255 to rotate the forked arm 251 in a counterclockwise direction but normally such clockwise rotation is limited by engagement of the hook member 250 with the stop shoulder 248. If, however, the feeding of two sheets causes the caliper member 237 to be swung in a clockwise rotation, the spring 246 will be permitted to rotate the bell crank 243 counterclockwise, as indicated in Fig. 8, thereby lowering the stop shoulder 248 out of the path of the hook member 250. This action permits the spring 255 acting on the forked arm 251 to bring the stud 252 against the corresponding operating arm 215 of the detector shaft thereby to trip the shaft. Subsequently, in the same feeding cycle the trip shaft will be restored by the cam 52, as heretofore mentioned.

It is apparent from the above description that the detector shaft 53 will be responsive to any one of the various detectors 35 and 36 and will be tripped whenever one of the feeders F either fails to feed a sheet during a feeding cycle or feeds two or more sheets instead of a single sheet. The detector shaft 53 may be aptly termed a discard control that is normally set at an inoperative position but will shift to an operative position in response to any of the detectors 35 and 36. The detectors function early in an operating cycle and later in the cycle the detector shaft or discard control 53 is reset automatically.

Since it may be desirable at times to make the detector shaft 53 non-responsive to the detectors, suitable means may be provided to latch the detector shaft in its normal position. Thus Fig. 7 shows a handle 256 for manual rotation of the detector shaft and shows a latch member 257 adapted for releasable engagement with a lateral pin 258 on the handle.

The transverse sheet conveyors

The transverse conveyors 37 may be regarded either as parts of the corresponding feeders F or as part of the group conveyor C. The construction of each of the transverse conveyors 37 may be understood by referring to Figs. 12 and 13. Each of the transverse conveyors consists essentially of three grippers 260 equally spaced on a continuous sprocket chain 261 that passes around a drive sprocket 262 on the previously mentioned shaft 135 and also passes around an idler sprocket 263. Each of the grippers 260 comprises a pair of gripper jaws that may be opened by pressure against a small operating arm 265 unitary with one of the jaws, the arm being provided with a suitable roller 266 to receive actuating pressure. Each gripper 260 is normally held closed by springs concealed therein and opens only when the sprocket chain carries the roller 266 against certain cams.

A horizontal frame 267 lying between the two traverses of the sprocket chain 261 provides a fixed cam or cam plate 268 to open the grippers 260 at a suitable point in their travel for receiving sheets from the feeders F. Normally a second cam 270 on the same frame 267 subsequently trips each gripper 260 to release the sheet to the group conveyor C. If, however, the detector shaft 53 has been tripped on the particular feeding cycle, the cam 270 will be automatically shifted to an inoperative position to permit the gripper 260 to carry the sheet beyond the normal release position and eventually the gripper moves against a third fixed cam 271 and is thereby caused to release the sheet to the corresponding discard tray 38.

Figure 12:
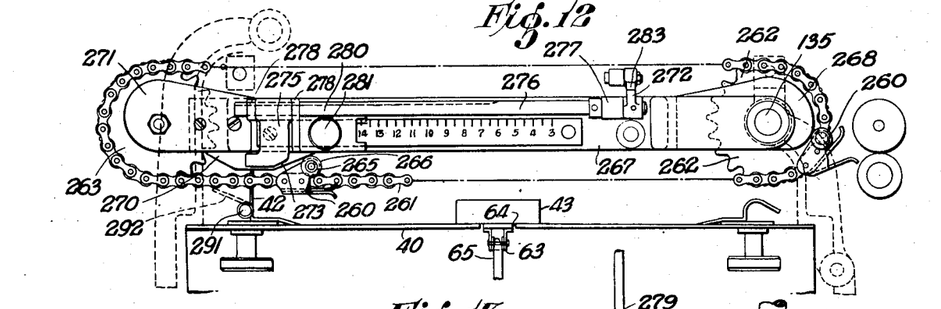
Fig. 12 is a fragmentary sectional view of a portion of the conveyor showing inside elevation means for delivering sheets from a conveyor.

The movable cam 270 is hingedly mounted on the cam bar 267 for operation by a suitable discard arm 272 and is also adjustable along the cam bar for various widths of sheets handled by the collator. In the present construction, the cam 270 is mounted on a hinge member 275 and the hinge member is slidingly keyed to a control shaft 276. The control shaft carries the above-mentioned control arm 272 and is journaled both in a fixed bearing 277 and in two spaced bearings 278. The two spaced bearings 278 slidably engage the control shaft 276 and are integral with a slide member 280 that may be moved along the cam bar 267 and releasably secured with a thumbscrew 281. Preferably the horizontal frame 267 is provided with a scale, as indicated in Fig. 12, for guidance in positioning the slide member 280 for various widths of sheets. Since the hinged member 275 is confined between the two bearings 278, the position of the hinged member is controlled by the slide member 280.

All of the discard arms 272 of the various transverse conveyors 37 are interconnected by links 279 (Figs. 13 and 15) for operation in unison. To cause such operation, the discard arm 272 at the end of the series is provided with a cam face 283 (Fig. 12) adapted to cooperate with a rotatable cam 285 (Fig. 15). Rotation of the cam 285 causes all of the cams 270 to swing to their inoperative positions thereby to cause all of the sheets fed on a feeding operation to be carried to the discard bins 38. The rotary cam 285 is mounted on the end of a cam shaft 286 which terminates in a rocker arm 287. The rocker arm 287 is connected by a link 288 with an actuating arm 290 that is keyed to the previously mentioned detector shaft 53. By virtue of this arrangement, tripping of the detector shaft 53 out of its normal position results in movement of all of the cams 270 out of their normal operative positions.

Figures 13, 14:
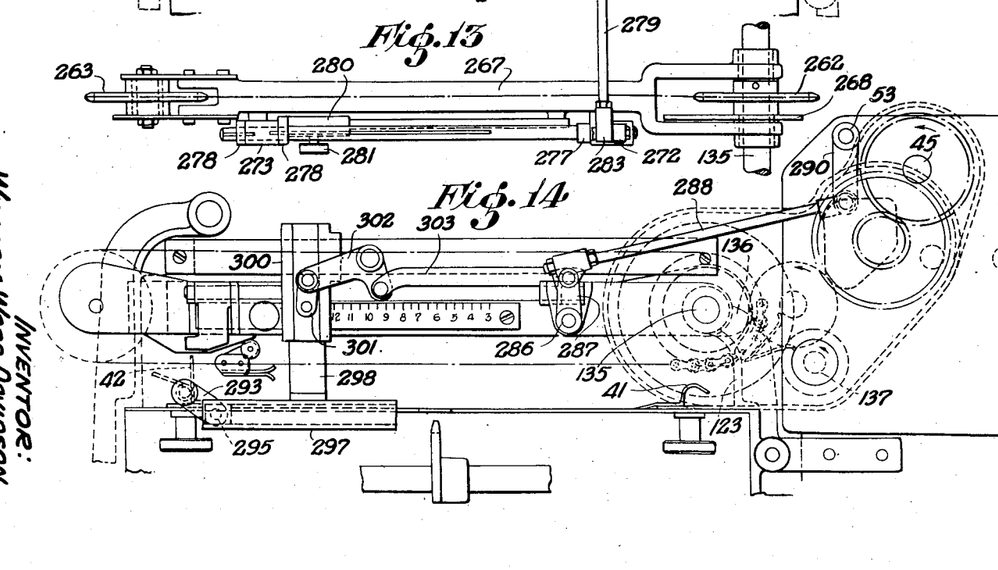
Fig. 13 is a plan view of the means shown in Fig. 11.
Fig. 14 is a view at the end of the conveyor showing in elevation certain mechanism involved in the discarding of sheets from a faulty feeding operation.

It may be noted in Fig. 12 that the sprocket chain 261 is below the top edge of the guide rail 42 of the conveyor C, the upwardly extending guide flange of the guide rail being suitably recessed to clear the sprocket chain. The advantage of such a relationship is that the guide rail normally serves both as a stop to strip a sheet from a newly opened gripper 260 and as means to align the edge of the newly released sheet with the group of sheets on which it is deposited. It is apparent, however, that the upwardly extending flange of the guide rail 42 is in the path along which sheets are to be conveyed when the normally operative cam 270 is swung out of its operative position in response to a faulty feed operation. I propose, therefore, to make the guide rail 42 in two longitudinal sections interconnected by a piano hinge 291 so that the upwardly extending portion of the guide rail may swing laterally to the position shown in dotted lines at 292 in Fig. 12 to permit the grippers 260 to carry sheets beyond the guide rail to discard. The mechanism for automatically swinging the flange of the guide rail 42 out of its normal upright position may be constructed as indicated in Figs. 14 and 15.

The swingable section of the guide rail 42 has a short control arm 293 at the end of which is a stud 295 carrying a thin roller 296. The thin roller 296 is engaged by a control bar 297 that is of U-shaped cross section and is of sufficient length to confine the thin roller at the various positions to which the guide rail 42 may be adjusted for sheets of various widths. The control bar 297 is carried by a vertical slide 298 mounted in a fixed housing 300 and is controlled in its vertical movements by a link 301 connected to a bell crank 302. The bell crank in turn is connected by a link 303 to the previously mentioned rocker arm 287.

To summarize at this point, tripping of the detector shaft 53 out of its normal position has three necessary effects in my preferred mode of operating the apparatus, namely, the temporary disengagement of the clutch 93 to cause the conveyor C to pause for one feeding cycle, the swinging of the normally operative cams 270 of the various transverse conveyors out of their effective positions to permit the fed sheets to be carried to the points of discard, and the swinging downward of the normally upright portion of the guide rail 42 to avoid interfering with movement of the sheets to discard.

*Control means responsive to repetitive discard*

As heretofore stated, it is contemplated that in my preferred mode of operation the apparatus will ordinarily skip faulty feeding operations but will either automatically stop or attract the attention of the operator in some manner whenever an excesive number of feeding operations are skipped in a relatively short period of time. A suitable control operative for this purpose may be constructed in the manner indicated by Fig. 16.

Figure 16:
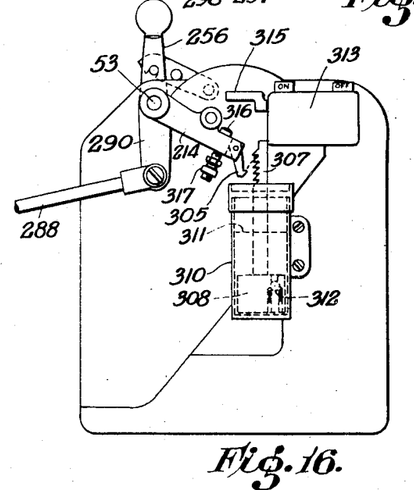
Fig. 16 is a view partly in elevation and partly in section of a control mechanism employed in one practice of the invention.

The previously mentioned resetting or restoring arm 214 that cooperates with the cam 52 for restoring the detector shaft 53 to its normal position is provided with a pivoted detent member 305 that is normally urged by a concealed spring to the position shown in Fig. 16. When the reset arm 214 swings upward or counterclockwise, as viewed in Fig. 16, in response to tripping of the detector shaft 53, the detent member 305 engages one of a series of teeth 306 on a plunger 307 thereby to advance the plunger by a distance greater than the width of a tooth.

The plunger 307 is part of a dashpot arrangement and terminates in a piston 308 in a dashpot cylinder 310, the cylinder containing a suitable liquid such as oil to the level 311. A check valve 312 in the piston 308 permits the piston and the attached plunger 307 to move upward in a free manner but closes to retard the downward movement of the piston to a rate limited by clearance around the piston or limited by some suitable adjustable by-pass in a well-known manner.

The retardation effect of the dashpot arrangement is such that the plunger 307 will have time for restoration to its normal lowermost position if lifted by the detent member 305 only infrequently but will not reach its normal lowermost position within a period of time equivalent to, say, two or three feeding cycles of the apparatus. Thus one discarding operation will lift the plunger to a given level and a second discarding operation occurring in the next succeeding feeding cycle, or the first cycle thereafter, will lift the plunger to a higher level, and three or four such frequent advances of the plunger will bring the plunger into contact with some responsive means such as a switch 313. The switch 313 is shown with an operating arm 315 in the path of the plunger 307. The switch 313 may operate a signal such as a signal lamp or an electric buzzer, but in my preferred practice the switch de-energizes the motor 81 to stop the machine to give the operator an opportunity to remedy the mechanical difficulty that causes the excesive number of discard operations.

If, for a different mode of operation, it is desirable to operate the switch immediately whenever one of the feeders F operates in a faulty manner, means may be provided whereby the arm 214 on the detector shaft 53 directly operates the switch 313. Thus in Fig. 16 a screw 316 shown in a retracted ineffective position on the arm 214 may be advanced into an effective position and secured by a lock nut 317. Whenever the detector shaft 53 is tripped while the screw 316 is thus advanced, the screw will contact the arm 315 of the switch 313 either to stop the machine or to energize some visual or audible signal means.

*Initiation control*

Figure 17:
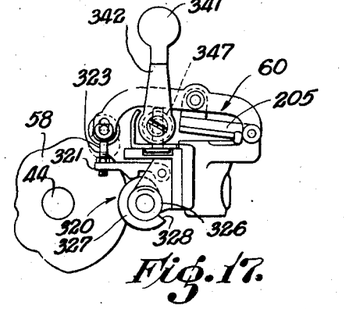
Fig. 17 is an end elevation of the so-called initial control.
Figure 18:
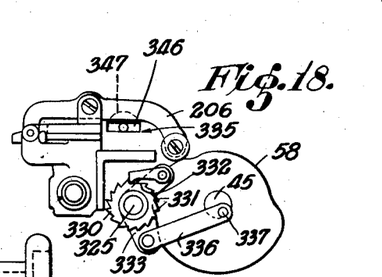
Fig. 18 is a similar view at the opposite end of the mechanism.

As heretofore stated, the purpose of the so-called initiation control is to place the series of feeders F in operation progressively in such manner as to avoid the delivery of incomplete groups to the stack holder H when a run is started with the conveyor C devoid of sheets. A mechanism that may be employed for such initiation control is shown in Figs. 17 and 18.

Initially the feeders F may be individually rendered inoperative by various expedients. I find it convenient for such purpose to utilize the previously mentioned valves 60 that control vacuum conditions in the various suction heads 30, but other expedients may be used in various practices of the invention. Each of the valves 60 may be opened to render the corresponding feeder inoperative simply by lifting the arm 206 that cooperates with the previously mentioned valve operating cam 58. Fig. 17 indicates how cam 320 may raise and lower the arm 206 through the medium of a small pivoted arm 321 having a downwardly extending lug 322 in contact with the cam. In the particular construction shown, the arm 321 is provided with an adjustable stud 323 for lifting contact with the arm 206. There is, of course, one cam 320 for each feeder F and all of the cams 320 are mounted on a control shaft 325 common to all of the feeders F.

Each of the cams 320 has a lower dwell 326, a gradual transition to an upper dwell 327, and finally a radial drop 328 from the upper dwell to the lower dwell. With the lug 322 of the arm 321 resting on the lower dwell 326 of a cam 320, the valve 60 is permitted to open and close in the normal manner in response to rotation of the valve control cam 58. Beginning with the cam 320 in such a position, rotation of the cam in a clockwise direction, as viewed in Fig. 17, will lift the valve arm 206, and, with continued rotation, the radial drop 328 will be reached to cause release of the valve arm 206.

The cams 320 are mounted on the control shaft 325 with the radial drops 328 at progressively different angles throughout the series of cams. In the particular construction suggested by Figs. 17 and 18, the angular positions of the cam drops 328 differ progressively by one-sixteenth of a rotation so that if, for example, the lug 322 at the first feeder F is at the lower dwell 326 of the corresponding cam 320 and the lugs 322 at the remaining feeders are positioned on the upper dwells of the corresponding cams 320, one-sixteenth of a rotation of the control shaft 325 will release the second feeder in the sequence for normal operation along with the first feeder and additional rotation of one-sixteenth rotation of the control shaft will release the third feeder for normal operation along with the first and second feeder, and so forth.

It is apparent that for such progressive initiation of the feeders F the cams 320 must vary in the circumferential extents of their upper and lower dwells. Thus a feeder that goes into operation early in the initiation sequence will have an upper dwell 327 that extends a relatively short distance around the circumference of the cam, the lower dwell 326 being correspondingly longer in circumferential extent. The particular cam 320 shown in Fig. 17 is at a feeder that goes into operation relatively late in the initiation sequence and therefore has an extensive upper dwell 327 and a relatively short lower dwell 326.

The provision for automatically advancing the control shaft 325 by one-sixteenth of a rotation may include a ratchet wheel (Fig. 18) 330 keyed to the control shaft, the ratchet wheel having fifteen equally spaced teeth 331 and an idler surface 332 of the same circumferential extent as one of the teeth. A bell crank 333 rotatably mounted on the control shaft 325 carries a pawl 335 for operation of the ratchet wheel 330 and is operatively connected by a link 336 with a crank pin 337 that is mounted eccentrically on the end of the cam shaft 45. By virtue of such an arrangement, the pawl 335 will be reciprocated once during each feeding cycle over a distance slightly greater than the width of one tooth of the ratchet wheel 330.

Figure 19:
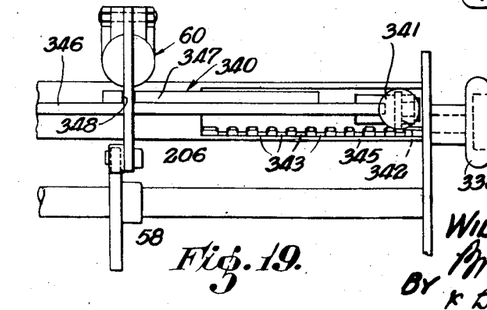
Fig. 19 is a fragmentary planned view of a selective control means employed in one practice of the invention.

Preferably, means is provided for guiding the operator in setting the described initial control for operation when desired. For example, a knob 338 may be placed on the end of the control shaft 325, as indicated in Fig. 19, with suitable index means (not shown) provided for indicating when the ratchet wheel 330 is at the idle position shown in Fig. 18 and also for indicating when the ratchet wheel is set for initiating operation of the machine.

When the control shaft 325 is at the idling position shown in Fig. 18, reciprocation of the pawl 335 by the crank pin 337 does not rotate the shaft since the reciprocation of the pawl is largely confined to the idler surface 332 of the ratchet wheel. To set the initiation control for operation, the operator merely turns the knob 338 clockwise to advance the ratchet wheel by a distance of approximately the width of one ratchet wheel tooth. This rotation to the set or starting position of the control shaft 325 places the various cams 320 in position to permit the valve 60 of the first feeder to operate in the normal manner but to hold open the remaining valves 60 and thereby make the remaining valves non-responsive to the corresponding valve operating cams 58. When the control arrangement is thus set, only the first feeder F in the sequence will operate on the first feeding cycle. The sheet received by the conveyor C will advance one station and then on the second cycle both the first and the second feeder in the sequence will operate. It is apparent that at the termination of the initiation sequence the first group delivered to the stack holder H by the conveyor C will be a complete group.

*Selective remote control for the feeders*

While the apparatus as described to this point is adequate for carrying out my preferred mode of operation, I find it desirable to add remote control means whereby the operator may selectively control the operation of the various feeders F, preferably selectively controlling the responsiveness of the valves 60 to the corresponding valve actuating cams 58. Such addition makes a total of three separate means for independently opening each valve 60, the first means being the associated valve operating cam 58, the second means being the above-described initiation control for the series of feeders, and the third means being a selective control, such as will now be described.

As shown in Figs. 17, 18 and 19, an elongated remote control member generally designated 340 extends along the series of feeders F and is both slidingly and rotatably mounted on the apparatus. At a remote control station, preferably at one end of the apparatus, a handle 341 is fixed to the remote control member 340, whereby the remote control member may be shifted longitudinally through a certain range of adjustment and may independently be rotated through three positions.

It is contemplated that when the handle 341 is in the upright position shown in Fig. 17, the remote control means 340 will prevent all of the valves 60 from closing and thereby render all of the feeders inoperative. When the handle is swung ninety degrees to the left from the intermediate position shown in Fig. 17, only one of the whole series of feeders will be free to operate in response to the corresponding valve operating cam 58, the particular feeder F that is made inoperative by the leftward movement of the handle being determined by the longitudinal adjustment of the remote control means 340. On the other hand, if the handle 341 is swung 90 degrees to the right from the intermediate position shown in Fig. 17, all of the feeders F will be released for normal operation.

Preferably the handle 341 has a relatively thin shank 342 for entrance selectively into the control recesses 343 of an index plate 345, each of the recesses being numbered to correspond with one of the series of feeders F. Thus to cause selective operation of the fourth feeder in the series of feeders, the operator may move the control handle 341 to a point opposite the fourth of the recesses 343, thereby causing corresponding longitudinal movement of the remote control means 340 and may then swing the handle left and down into the fourth recess to cause all of the valves 60 to be held open with the exception of the valve controlling the suction head 30 of the fourth feeder F.

A remote control member 340 to function in the described manner may comprise a flat bar 346 suitably mounted for longitudinal and rotary movement with one face of the bar left blank and with the opposite face of the bar provided with elongated cam elements 347 of rounded cross sectional configuration. When the handle 341 is in the upright position, the flat bar 346 is turned edgewise, as indicated by dotted lines in Fig. 17, and in such edgewise position holds all of the valve arms 206 elevated to maintain all of the valves 60 in open position. When the handle is swung to the right, as viewed in Fig. 17, the blank side of the flat bar 346 is turned uppermost and permits all of the valves 60 to close.

When the handle 341 is swung to the left, from its intermediate position, the cam elements 347 become effective to hold all but one of the valve arms 206 in their elevated positions. The cam elements 347 are so spaced along the flat bar 346 as to form a cam gap 348 (Fig. 19) for each of the valve arms 206, the gap being wide enough to permit the valve arm to drop to the closed position of the valve. The various cam gaps 348 are so distributed that when the handle 341 is opposite one of the recesses 343 of the index plate 345, a cam gap 348 is opposite the valve arm 206 of the corresponding feeder F and the rest of the cam gaps 348 are out of register with the rest of the valve arms. Thus Fig. 19 shows the handle 341 opposite the first recess in the index plate 345 and shows the corresponding first cam gap 348 opposite the valve arm 206 of the first feeder in the series.

Operation of the collator

The preferred mode of operation may be readily understood from the foregoing description. After initiating operation as described, the operator need not give close attention to the performance of the collator. One operator may supervise a number of simultaneously operating collators of this type. Whenever one of the feeders F functions in a faulty manner, one of the detectors 35 or one of the detectors 36 will function to cause that particular feeding operation to be skipped, that is to say, will function to cause all of the sheets fed on that feeding cycle to be discarded and also to cause the conveyor C to pause for the duration of that feeding cycle.

If the cause of the faulty feeding operation is merely incidental, the same cause will not be effective on the next feeding cycle and only rarely will trivial or incidental causes of malfunctioning be effective on two or three successive feeding cycles. The operator's time will not be taken up unnecessarily by such trivial causes, and, since the machine continues operation without losing momentum, the cost in production incurred by the infrequent trivial causes is insignificant. Should, however, any permanent or more than incidental cause of feeding failure arise in the course of machine operation, a continuous succession of feeding failures will occur, or at least a relatively large number of feeding failures will occur in a relatively short period of time in which event the switch 313 will be operated to de-energize the whole apparatus.

Other modes of operation

In one of the various modes of operation that are available in the use of the described apparatus, the discarding mechanism is not employed and whenever one of the detectors 35 or one of the detectors 36 functions in response to a faulty feeding operation, the machine simply stops. The operator may then take whatever corrective measures are necessary and resume operation of the machine.

To cause the machine to operate in this manner, the following steps are taken. The screw 316 on the reset arm 214 of the detector shaft 53 is advanced from the position shown in Fig. 16 so that tripping of the detector shaft 53 will cause the reset arm acting through the screw 316 to operate the switch 313. The connecting rod 128 (Fig. 4) is disconnected at one end to make the clutch 93 non-responsive to the detector shaft 53. Finally, the link 288 (Fig. 14) is disconnected at one end to make the discard mechanism non-responsive to tripping of the detector shaft 53.

If the apparatus stops in the manner described, and the operator observes that the difficulty is the failure of one of the feeders F to feed a sheet, he may take care of the matter by remote control. The first step after the collator stops is to shift the handle 341 leftward from its normal position (the extreme rightward position, as viewed in Fig. 17) to the particular recess 343 in the index plate 345 corresponding to the feeder that failed to supply a sheet to the group conveyor. The second step is to close the energizing circuit of the motor 81 while pulling the clutch handle 118 outward momentarily to cause the group conveyor C to pause for the duration of the first feeding cycle after the resumption of operation. As a result of these manipulations, only the selected feeder operates on the next feeding cycle and the group conveyor C remains stationary so that the missing sheet is delivered to its proper place on the group conveyor. At the end of a corrective feeding cycle an operator returns the handle 341 to its normal ineffective position and releases the clutch handle 118 to permit the group conveyor to resume operation on the succeeding feeding cycle.

In another mode of operation, the functioning of any of the detectors 35 or any of the detectors 36 merely signalizes a faulty feeding operation without stopping the machine, whereupon the attendant takes whatever corrective measures are necessary. If one of the feeders causes two sheets instead of one to be deposited on the group conveyor, the operator will merely transfer the surplus sheet to the corresponding discard bin 38 without stopping the machine. If the difficulty is failure of one of the feeders to supply a sheet, the operator may supply the missing sheet to the group conveyor manually from a corresponding discard bin 38, or, if necessary, from the corresponding supply stack 31. Another procedure for supplying a missing sheet is for the operator to manipulate the remote control handle 341 and the clutch handle 118 in the manner above described to cause the group conveyor to pause for a feeding cycle in which feeding cycle only one of the feeders operates for the purpose of supplying the missing sheet.

The previously mentioned signal flags 229 and 244 are especially useful in this last described mode of operation, since the operator need only glance down the two rows of signal flags to ascertain which feeder or feeders have failed to function in a feeding cycle and in what manner the feeder or feeders have failed to function, Thus, momentary dropping of a flag 229 denotes that a sheet has been skipped by the corresponding feeder and momentary dropping of a flag 244 denotes the feeding of plural sheets by the corresponding feeder.

My description in specific detail of a preferred form of my invention made for the purpose of disclosure and to illustrate the principles involved will suggest to those skilled in the art various changes and substitutions under my basic concepts and I reserve the right to all such departures from my disclosure that properly lie within the scope of my appended claims.

I claim:

1. In a collator, a conveyor to receive sheets at a plurality of receiving stations for the progressive forming of groups of sheets on the conveyor, a plurality of sheet feeders to separate single sheets from supply stacks and to deliver the separated sheets to said stations, means responsive to faulty operation by any one of said feeders to discard the separated sheets and to delay said conveyor for one feeding cycle, and means effective to stop all of said feeders in response to a succession of feeding cycles with faulty operation.

2. In a collator, a conveyor to receive sheets at a plurality of receiving stations for the progressive forming of groups of sheets on the conveyor, a plurality of sheet feeders to separate single sheets from supply stacks and to deliver the separated sheets to said stations, means responsive to faulty operation by any one of said feeders to discard the separated sheets and to delay said conveyor for one feeding cycle, and a control means movable step by step from a normal position to a position effective to stop all of said feeders, said control means being movable one step towards said effective position in response to faulty operation of any one of said feeders, said control means being adapted to retract towards said normal position at a rate slower than one step of movement in one feeding cycle whereby said control means reaches said effective position only when a plurality of sheet discarding operations occur in a relatively short period of time.

3. In a collator, conveyor means to receive sheet material at a plurality of stations, drive means for driving said conveyor to transport the sheet material, a series of sheet feeders to feed sheets at said stations to form piled groups of sheets on the conveyor means, cyclic means to actuate said sheet feeders, initiating control means to render said feeders inoperative and to release the feeders in sequence for operation by said cyclic means thereby to form complete initial groups of sheets on the conveyor means, selective control means to render all but any selected one of said feeders inoperative during a cycle of said actuating means for supplying a missing sheet to a deficient group of sheets on the conveyor, and means associated with said drive means for disengaging the latter upon actuation of said selective control means.

4. In a collator, a series of sheet feeders, a conveyor to receive sheets from said feeders, drive means for said conveyor for the progressive advancement thereof past said feeders for the progressive forming of groups of sheets on the conveyor, cyclic means to actuate said sheet feeders, selective control means movable from a normal ineffective position to a position rendering all but any selected one of said feeders inoperative for supplying a missing sheet to a deficient group on the conveyor, and means associated with said drive means for disengaging the latter upon actuation of said selective control means.

5. In a collator, a series of sheet feeders, a conveyor to receive sheets from said feeders for the progressive formation of groups of sheets on the conveyor, cyclic means to actuate said sheet feeders, and control means rotatable about an axis extending transversely of said sheet feeders from a normal position permitting operation of all of said feeders to a restricting position at a selected one of said feeders for preventing operation of all but said selected one of said feeders, said control means being movable axially to vary the feeders selected at said restricting position whereby said feeders may be operated selectively to supply missing sheets to said groups.

6. In a collator, first conveyor means to receive sheets at a series of receiving stations thereon for the progressive forming of groups of sheets on said first conveyor means from stacks of supply sheets disposed so that said sheets lie substantially horizontally along one side edge of said conveyor means at each of said receiving stations, a plurality of second conveyor means extending transversely and horizontally of said first conveyor means one between each of said stacks of supply sheets and said receiving stations including gripper means adapted to carry sheets from said supply stacks substantially horizontally and transversely of said first conveyor, first cam means having an operative position and an inoperative position and adapted in the operative position for opening said gripper means when said second conveyor means are disposed in position for releasing sheets carried thereby upon said receiving stations, and second cam means for opening said gripper means when disposed in position extending beyond the other side edge of said first conveyor means.

7. In a collator, first conveyor means to receive sheets at a series of receiving stations thereon for the progressive forming of groups of sheets on said first conveyor from stacks of supply sheets disposed so that said sheets lie substantially horizontally along one side edge of said conveyor means at each of said receiving stations, a plurality of second conveyor means extending transversely and horizontally of said first conveyor means one between each of said stacks of supply sheets and said receiving stations including gripper means adapted to carry sheets from said supply stacks substantially horizontally and transversely of said first conveyor means, detecting means to detect failure of delivery of a single sheet to each of said second conveyor means from said supply stacks, first cam means having an operative position and an inoperative position and adapted in the operative position thereof for opening said gripper means when said second conveyors are disposed in position for releasing sheets carried thereby upon said receiving stations, means between said detecting means and said first cam means for rendering the latter inoperative upon said detector means detecting failure of the delivery of a single sheet to each of said second conveyor means, and second cam means for opening said gripper means when disposed in position extending beyond the other side edge of said first conveyor means, whereby the sheets are carried by said gripper means beyond the other side edge of said first conveyor means when said first cam means is rendered inoperative.

8. In a collator, conveyor means to receive sheets at a series of receiving stations thereon for the progressive forming of groups of sheets on the conveyor, a plurality of sheet feeders arranged in a row and disposed in juxtaposition of said conveyor means lengthwise of one side edge thereof one at each of said receiving stations for supporting stacks of supply sheets so that said sheets are disposed substantially horizontally, said feeders including means to separate single sheets from the supply stacks and feed the same substantially horizontally toward said conveyor means, detector means to detect failure of the individual feeders to perform properly, a discard control normally set in an inoperative position, said discard control being movable to an operative position in response to said detector means when any of said feeders fail to function properly, carrier means for receiving sheets from said feeders and movable substantially horizontally and transversely of said conveyor means, means for said conveyor means operative in said inoperative position of said discard control to actuate said carrier means for discharging the sheets carried thereby upon said conveyor means, said discard control when disposed in operative position being adapted to render said last named means ineffective, and means for said carrier means operative to actuate the latter when disposed in position beyond the other side edge of said conveyor whereby the sheets are carried by said carrier means beyond the other side edge of said conveyor means when said discard control is disposed in operative position.

9. In a collator, conveyor means to receive sheets at a series of receiving stations thereon for the progressive forming of groups of sheets on the conveyor, means for supporting supply stacks of sheets so that said sheets lie substantially horizontally arranged in a row and disposed in juxtaposition of said conveyor means lengthwise of one side thereof one at each of said receiving stations and including means to elevate periodically the bottom of said stacks to compensate for the removal of sheets from the stacks, a series of sheet feeders corresponding to said stations each including means to separate single sheets from the corresponding supply stack and feed the same substantially horizontally toward said conveyor means, detector means to detect failure of the individual feeders to perform properly, a discard control normally set in an inoperative position, said discard control being movable to an operative position in response to said detector means when any of said feeders fail to function properly, carrier means for receiving sheets from said feeders and movable substantially horizontally and transversely of said conveyor means, means for said carrier means operative in said inoperative position of said discard control to actuate said carrier means for discharging the sheets carried thereby upon said conveyor means, said discard control when disposed in operative position being adapted to render said last named means ineffective, and means for said carrier means operative to actuate the latter when disposed in position beyond the other side edge of said conveyor whereby the sheets are carried by said carrier means beyond the other side edge of said conveyor means when said discard control is disposed in operative position.

WILLIAM WARD DAVIDSON.

REFERENCES CITED

The following references are of record in the file of this patent:

UNITED STATES PATENTS

| Number | Name | Date |
| --- | --- | --- |
| 420,194 | Gauchot | Jan. 28, 1890 |
| 591,094 | Dexter | Oct. 5, 1897 |
| 740,532 | Cleathero | Oct. 6, 1903 |
| 765,414 | Dexter | July 19, 1904 |
| 997,334 | Smith et al. | July 11, 1911 |
| 1,023,568 | Juengst | Apr. 16, 1912 |
| 1,039,541 | Kast | Sept. 24, 1912 |
| 1,040,689 | Juengst | Oct. 8, 1912 |
| 1,071,555 | Juengst | Aug. 26, 1913 |
| 1,365,380 | Christophel | Jan. 11, 1921 |
| 1,600,022 | Van Heek | Sept. 14, 1926 |
| 1,815,744 | Sullivan | July 21, 1931 |
| 1,833,292 | Krick | Nov. 24, 1931 |
| 1,886,282 | Low | Nov. 1, 1932 |
| 2,020,027 | Gore | Nov. 5, 1935 |
| 2,178,713 | Wood | Nov. 7, 1939 |
| 2,298,368 | Goebel et al. | Oct. 13, 1942 |
| 2,325,455 | Williams | July 27, 1943 |